United States Patent [19]
Ferguson

[11] Patent Number: 4,734,555
[45] Date of Patent: Mar. 29, 1988

[54] METHOD AND APPARATUS FOR MEASURING AND CONTROLLING INDENTATION IN RESISTANCE WELDING

[75] Inventor: Hugo S. Ferguson, Averill Park, N.Y.

[73] Assignee: Duffers Scientific, Inc., Troy, N.Y.

[21] Appl. No.: 51,476

[22] Filed: May 18, 1987

Related U.S. Application Data

[63] Continuation-in-part of Ser. No. 878,713, Jun. 26, 1986, abandoned.

[51] Int. Cl.$^4$ .............................................. B23K 11/24
[52] U.S. Cl. .................................... 219/109; 219/110
[58] Field of Search ................................. 219/109, 110

[56] References Cited

U.S. PATENT DOCUMENTS

| | | | |
|---|---|---|---|
| 3,632,956 | 1/1972 | Herbst | 219/109 |
| 3,708,648 | 1/1973 | Croucher et al. | 219/109 |
| 3,727,822 | 4/1983 | Umbaugh | 228/1 |
| 4,296,304 | 10/1981 | DeFourney | 219/110 |
| 4,376,883 | 3/1983 | Dao et al. | 219/109 |
| 4,419,558 | 12/1983 | Stiebel | 219/110 |
| 4,447,699 | 5/1984 | Gold et al. | 219/110 |
| 4,447,700 | 5/1984 | Cohen | 219/117.1 |
| 4,449,029 | 5/1984 | Nied | 219/117.1 |
| 4,461,944 | 7/1984 | Cohen | 219/110 |
| 4,542,277 | 9/1985 | Cecil | 219/110 |

FOREIGN PATENT DOCUMENTS 52-39551 3/1977 Japan .

OTHER PUBLICATIONS

K. C. Wu, "Electrode Indentation Criterion for Resistance Spot Welding", Welding Journal, Oct. 1968, pp. 472S-478S.

A. Stiebel, et al., "Monitoring and Control of Spot Weld Operations", *Conference Proceedings of the 1986 Sheet Metal Welding Conference II*, Detroit, Mich., Oct. 27-29, 1986, pp. 1-17.

*Primary Examiner*—Clifford C. Shaw
*Attorney, Agent, or Firm*—Stanger, Michaelson, Reynolds, Spivak and Tobia

[57] ABSTRACT

Apparatus and accompanying methods for use therein for measuring and controlling weld indentation during resistance welding operations are disclosed. During a welding operation, the apparatus measures changes in a distance separating a reference point located on an electrode assembly and a region situated on the surface of the workpiece being welded wherein the region is not substantially indented by the electrode. Specifically, a distance measuring system first establishes the location of the surface relative to the electrode before any welding current is passed through the weld area. The indentation is repeatedly measured by detection of ultrasonic echoes from the surface of the material being welded. Such measurements are taken at frequent intervals during the current flow period during which the weld is being formed in order to determine on a continuous basis the indentation of the electrode into the surface. The welding power may be terminated when the measured indentation reaches the desired value. In order to obtain more precise control of the indentation, the rate at which indentation occurs can be measured and the welding power can be changed on a half cycle by half cycle basis to increase or decrease the indentation rate according to a desired indentation program.

40 Claims, 6 Drawing Figures

METHOD AND APPARATUS FOR MEASURING AND CONTROLLING INDENTATION IN RESISTANCE WELDING

CROSS-REFERENCE TO RELATED APPLICATION

This application is a continuation-in-part of my copending U.S. patent application entitled "METHOD AND APPARATUS FOR MEASURING AND CONTROLLING INDENTATION IN RESISTANCE WELDING" filed June 26, 1986 and assigned Ser. No. 06/878,713, now abandoned.

BACKGROUND OF THE INVENTION

1. Field of the Invention

The present invention relates to a method and apparatus for performing welding operations and, more precisely, to a technique for detecting and controlling the indentation of a weld during resistance welding operations.

2. Description of the Prior Art

Resistance welding refers to a type of welding in which separate parts are welded together by heat generated by the passage of an electrical (welding) current through a welding area occurring in those parts. The amount of heat generated thereby is governed by the electrical resistance of these parts to the passage of an electrical current through the welding area and the magnitude of this current. During the welding process, mechanical pressure is used to force the parts together. In resistance spot welding, which is by far the most common type of resistance welding, a weld is formed by localized welding and subsequent coalescing of a small volume of material located at two abutting faying surfaces due to the heating caused by the passage of the welding current through these surfaces. A detailed discussion of the resistance welding process may be found in *Resistance Welding Manual*, (Third Edition) published by the Resistance Welder Manufactures' Association.

There is a direct relationship between electrode indentation measured after the welding process has been completed and the strength of the weld, as documented in K. C. Wu, "Electrode Indentation Criterion for Resistance Spot Welding," *Welding Journal*, October 1968, pages 472-S to 478-S (hereinafter referred to as the "Wu paper"). Many attempts have been made to measure and/or control the resistance spot welding process by measuring any change in the distance between the tips of two opposing electrodes, i.e. inter-electrode displacement, while two (or more) materials situated therebetween are being welded to each other. See, for example, the following U.S. Patents which disclose apparatus which measures inter-electrode displacement: U.S. Pat. Nos. 4,419,558 (Stiebel); 4,542,277 (Cecil); 4,296,304 (Defourney); and 4,447,700 (Cohen).

Indentation is defined to be a depression that is produced in an external surface of a material being welded and caused primarily by a welding electrode forging the surface of the material in the spot weld area or the nugget region, i.e. the area where the material was liquid during the formation of the weld nugget. The external surface of the material adjacent to the nugget on one or more sides becomes indented or depressed due to the reduced hot strength of the material which supports the electrodes. As such, the electrodes exert a forging force while the weld nugget is being formed.

Measurements of inter-electrode displacement resulting from growth of the material between the electrodes during the time welding current is flowing has led researchers to believe that most of the indentation occurs while the nugget is solidifying, i.e. after the welding current has been turned off. U.S. Pat. No. 4,419,558 (Stiebel), hereinafter referred to as the '558 patent, at Column 2, line 46 indicates that the amount of indentation needed to control the welding process, i.e. to ensure that welds having sufficient strength are being formed, is about 0.001 inches (approximately 0.0025 centimeters) for sheet metal, which is typically about 0.040 inches (approximately 0.10 centimeters) thick. Thus, the desired indentation as taught by the '558 patent is about 2.5% of the total sheet thickness. However, this value is not consistent with published data. For example, the Wu paper indicates that an indentation of 5 to 10 percent of the thickness of a sheet is the most desirable amount of indentation to produce welds having sufficient strength. Clearly, five percent of 0.040 inches (approximately 0.10 centimeters) is 0.002 inches (approximately 0.0051 centimeters) and 10 percent of 0.040 inches is 0.004 inches both of which values are well in excess of the values disclosed in the '558 patent. Additionally, thicker sheet materials would have proportionately larger indentations. Unfortunately, all such indentations are much larger than the measured values obtained form inter-electrode displacement measurements.

The small measurement obtained by measuring inter-electrode displacement occurs because such a measurement fails to take account of thermal expansion of the material that occurs during the welding process. Specifically, in measuring inter-electrode displacement, the measured value contains a portion resulting from thermal expansion and another portion resulting from indentation. Since thermal expansion occurs in a direction opposite to that for indentation, the material growth resulting from expansion cancels out (masks) a portion of the material shrinkage resulting from indentation thereby causing the overall indentation to change much less than would be expected. While the Wu paper shows that a direct relationship exists between weld strength and indentation, the applicant is aware of no teachings in the art that correlate weld strength to material expansion. Now, for some combinations of materials, electrode shape and welding conditions, expansion may be equal to or considerably larger than indentation. Consequently, indentation, measured through inter-electrode displacement, may be zero due to expansion when, in fact, indentation has actually occurred. As a result, measurements of inter-electrode displacement made during a welding operation can not generally be used to accurately assess weld strength.

In this regard, see A. Stiebel et al, "Monitoring and Control of Spot Weld Operations," *Conference Proceedings of the* 1986 *Sheet Metal Welding Conference II*, Detroit, Mich., Oct. 27–29, 1986, pages 1–17 (hereinafter referred to as the "Stiebel paper"). The Stiebel paper does recognize that indentation is indicative of weld strength. Unfortunately, this paper discloses a system for measuring indentation based on measurements of force induced inter-electrode displacement. As noted above, inter-electrode displacement resulting from expansion greatly masks any indentation occurring during the formation of the weld. With such a system, indentation can only be accurately measured after the weld has been made and, more specifically, after the material has contracted back to its original thickness. Consequently, the system disclosed in the Stiebel paper can not accurately measure indentation occurring during weld formation and much less control the indentation as it occurs—thereby exhibiting problems typical to all systems known in the art that rely on using measurements of inter-electrode displacement.

Therefore, a need exists in the art for apparatus, and accompanying methods for use therein, that accurately measures the indentation that occurs during a welding operation. A need also exists in the art for apparatus and accompanying methods to accurately control a resistance spot welder, based upon the measured indentation, in order to ensure that substantially all the welds made thereby have sufficient strength.

SUMMARY OF THE INVENTION

The present invention measures weld indentation by determining changes in separation, occurring during a weld operation, between a reference point on an electrode assembly and an area on the surface of the workpiece which is located adjacent to the area of contact between an electrode and the surface of the workpiece and which is not substantially indented by the electrode. Such a measurement can be made at one or both electrodes that are used in the same welding operation. According to the teachings of the present invention, a distance measuring system first establishes the location of an external surface of the workpiece relative to a reference point on an electrode assembly before any welding current is passed through the weld area. The electrode assembly includes both the electrode and the holder as well as any other mechanical elements that are fixedly secured to the holder. The measurement is repeatedly taken at frequent intervals while the welding current is flowing in order to continuously determined the amount by which the electrode indents the surface of the workpiece during the welding operation.

While a portion of the material located at the faying surfaces of the workpieces melts, the surface of the workpiece situated at an electrode-to-surface interface begins to be indented by the electrode. Welding current may be terminated when the measured indentation reaches a desired value, such as between 5 to 10% of the thickness of the thinnest surface piece being welded. The surface pieces are the two workpieces that abut against the electrodes during the weld operation. Now, in order to obtain more precise control of indentation, the rate at which the indentation occurs can be measured and the welding current can be changed to increase or decrease the indentation rate according to a desired indentation program (predefined indentation curve).

The total indentation, including the indentation due to shrinkage from solidification of the nugget and cooling of the workpieces, may also be measured by continuing the indentation measurement during the short cooling period (the so-called "Hold" period) which typically occurs after the welding current has been terminated but before the electrodes are retracted.

During mass production, many welds are typically made before the electrodes are changed. As a result, the wear on the electrode tips may be substantial. Since the inventive method measures the spatial relationship (separation) between the electrode and the surface of the workpiece at the beginning of each weld, electrode wear is automatically eliminated from the indentation measurement.

Since the desired indentation is a percentage of the initial thickness of the thinnest surface piece being welded, a measurement is made of the initial separation of the electrodes before the welding current flows. This thickness measurement is used to obtain the desired indentation value for control purposes. In order to eliminate errors in thickness measurements which would result from electrode wear, the thickness measurement is occasionally made without the workpieces placed between the electrodes in order to establish the zero thickness value.

BRIEF DESCRIPTION OF THE DRAWINGS

The teachings of the present invention will be readily understood by considering the following detailed description in conjunction with the accompanying drawing, in which.

To facilitate reader understanding, identical reference numerals have been used to denote identical elements which are common to the figures.

DETAILED DESCRIPTION

Figure 1:
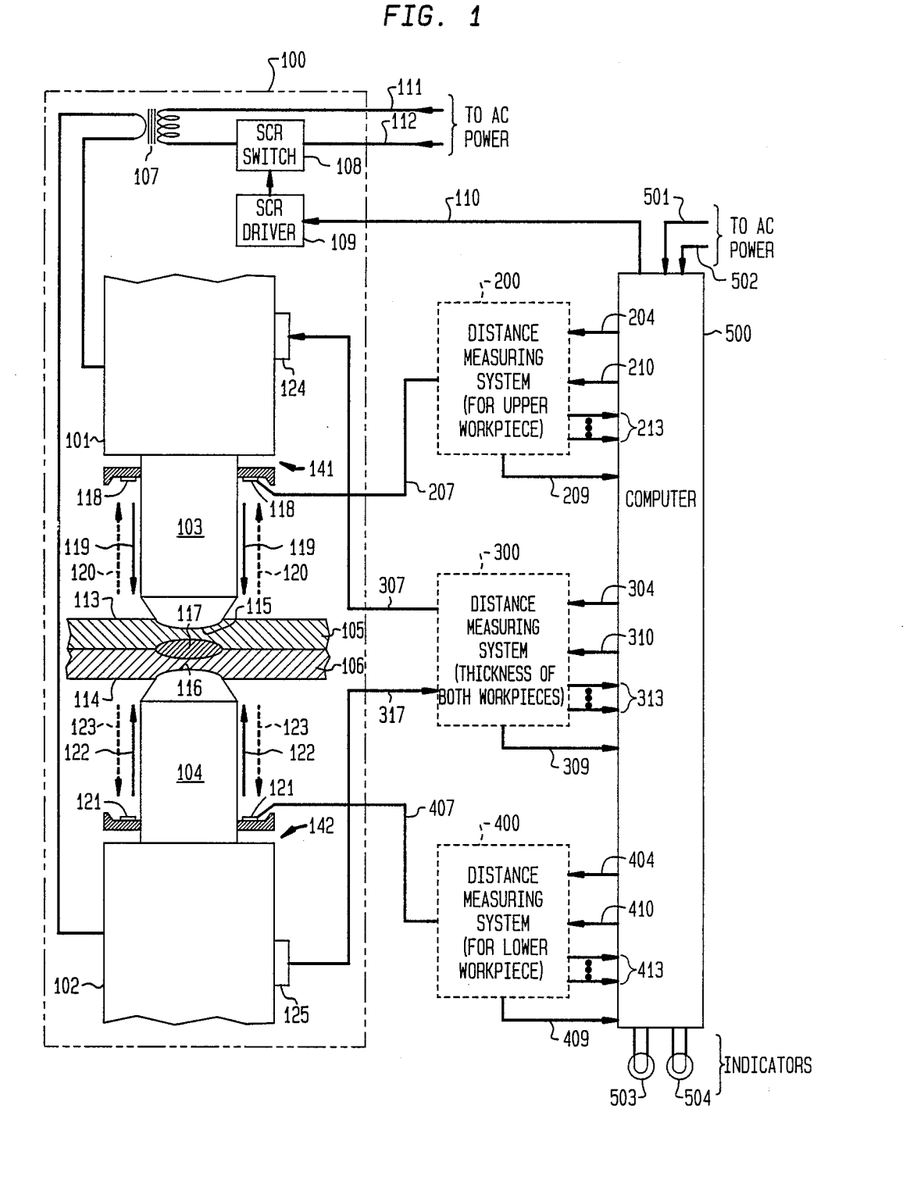
FIG. 1 is a schematic diagram of one embodiment of the present invention of apparatus for measuring and controlling indentation occurring in resistance spot welding.
Figure 1A:
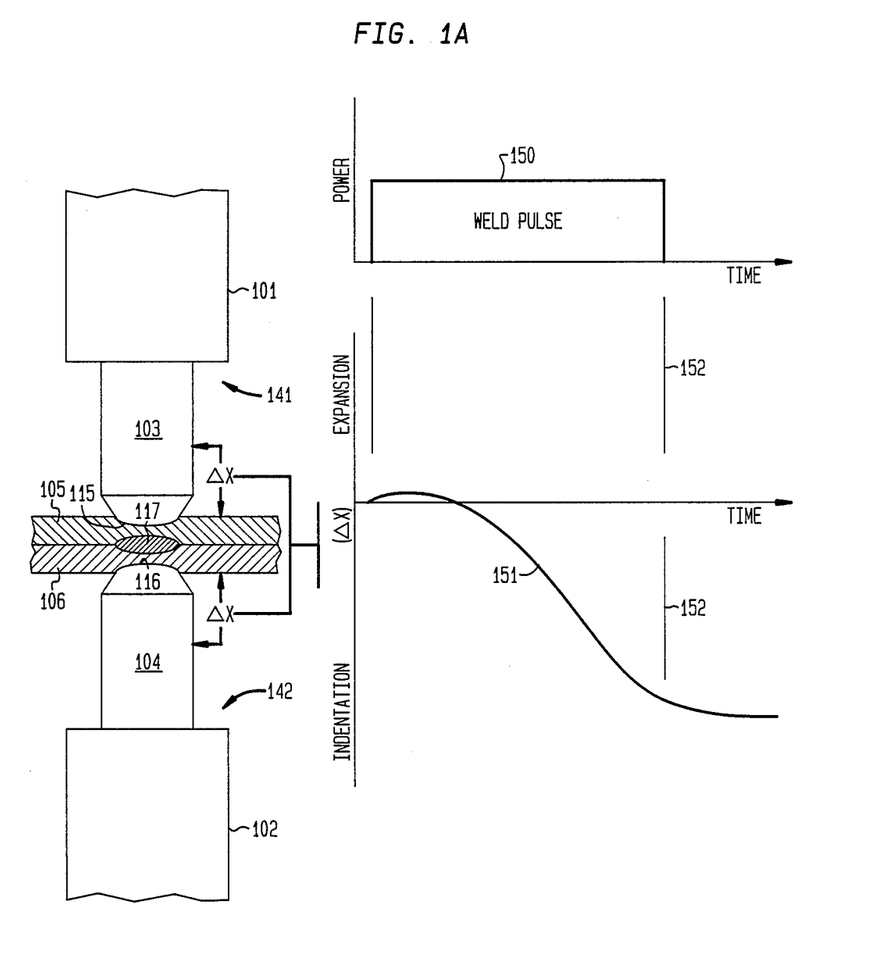
FIG. 1A provides a simplified diagram of resistance spot welding apparatus showing where indentation is measured and also provides curve 150 of a typical welding pulse and curve 151 of accompanying indentation both occurring during a welding operation.

Referring to FIG. 1A, electrode holders 101 and 102 securely hold upper and lower electrodes 103 and 104, respectively, and form part of a typical resistance spot welder. Each electrode is fixedly secured in its corresponding holder. Both elements comprise an integral electrode assembly, such as electrode assembly 141 for holder 101 and electrode 103, and electrode assembly 142 for holder 102 and electrode 104. Each electrode assembly may include any other well-known and not shown mechanical elements, such as a supporting arm, that is typically secured to the electrode holder and/or the electrode. Also, the mechanical support for the power transformer and welding control system is not shown. Materials (workpieces) 105 and 106, that are to be welded, are squeezed between the electrodes, and an electrical (welding) current is passed through the materials via both electrodes. The largest resistance to the flow of current usually occurs at the interface between materials 105 and 106. Both of these workpieces may illustratively be plain carbon steel. The current concentrated by the electrodes causes the temperature to increase rapidly thereby forming a liquid region 117, which after the flow of welding current stops, cools and solidifies into a region called the weld nugget.

Figure 5:
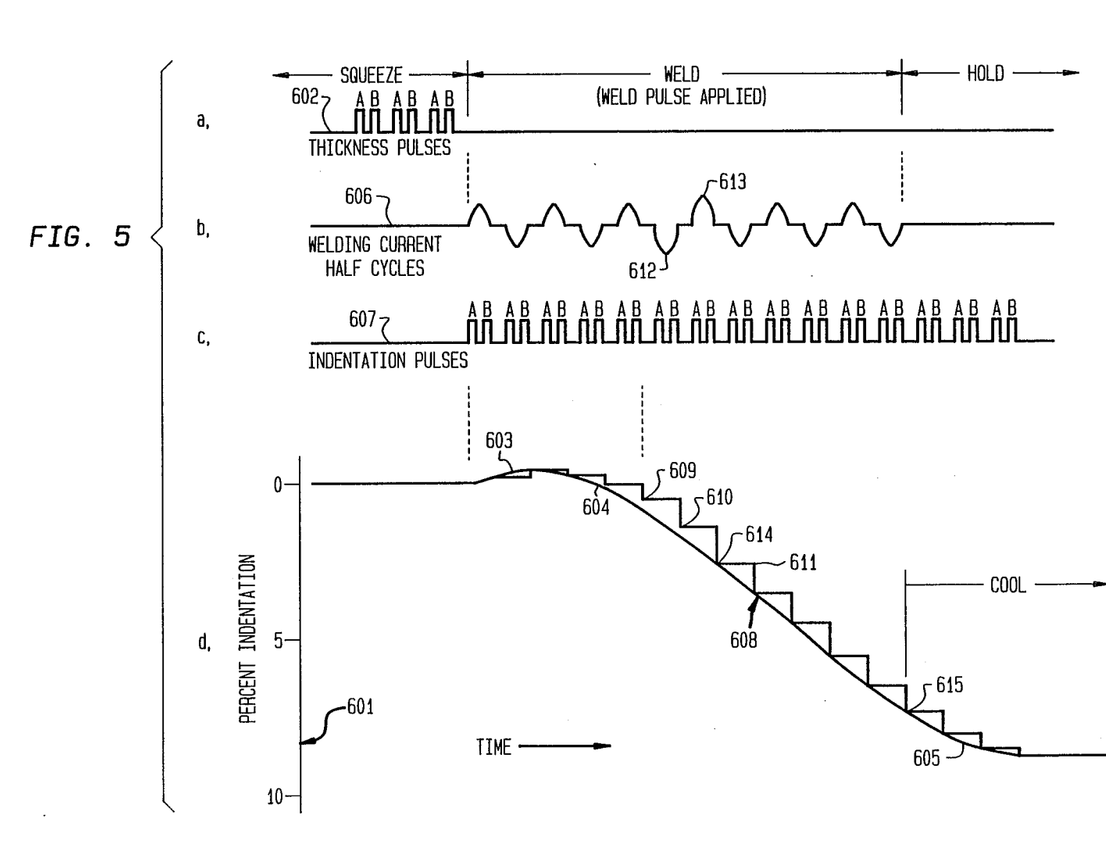
FIG. 5 depicts graphical representations of the time relationship of three signals (signals a, b and c) present while a weld is formed, using the methods and apparatus of the present invention, and the simultaneously occurring indentation (curve d).

Now, while welding current is being applied to the workpieces, i.e. during weld pulse 150, the distance x changes. Changes in this distance, i.e. delta x shown in curve 151, provide a measure of the indentation occurring in a surface of a workpiece. Specifically, delta x is measured as a change in the distance (separation) occurring between a fixed reference point, located at any pre-defined point along an electrode assembly (such as a point located on electrode 103, as shown, but, more likely, in practice, at a point situated on holder 101), and a corresponding region or area on an external surface of a workpiece that is located immediately adjacent to the are where the electrode contacts the workpiece but is not substantially indented by the electrode during a welding operation. The weld pulse, as shown in signal b of FIG. 5, is, in fact a series of half cycles (approximately sinusoidally shaped pulses) of welding current wherein the duration of each half cycle can be separately controlled. As shown by curve 151 in FIG. 1A, the value of delta x first increases early in the weld pulse. This occurs because the material situated in the vicinity of tips 115 and 116 of electrodes 103 and 104, respectively, begins to heat and hence begins undergoing thermal expansion. Workpieces 105 and 106 quickly reach higher temperatures where their strength decreases. Due to the large force holding the electrodes together the electrodes exert a forging force onto these workpieces which eventually indents the surface of these workpieces which, in turn, causes the value of delta x to decrease rapidly. This occurs later during the weld pulse. The end of weld pulse 150 occurs at a time indicated by vertical lines 152. However, the value of delta x continues to decrease after the weld pulse has terminated, i.e. after line 152. This additional decrease occurs because nugget 117 solidifies and shrinks and also workpieces 105 and 106 cool and shrink.

Curve 151, which represents indentation, provides a good indication of nugget growth during the weld pulse and can be used, as described in detail below, to control the welding power for this spot welding process. Curve 151 can be measured by any one of many different suitable methods, such as illustratively optically, acoustically, mechanically or magnetically (such as through eddy current measurements). Optical measurements will generally involve measuring the time of flight of a laser beam from the time the beam emanates from a suitable emitter, strikes the region on the surface of the workpiece and then returns to a suitable detector. The emitter and detector will generally be located at the same or different fixed reference points on the electrode assembly. Since optical measurements rely on reflections from the workpiece surface, any dirt or irregularities on the surface will corrupt the measurements. For this reason, optic measurements are not preferred in an industrial environment. Mechanical distance measurements, made through for example a linear voltage differential transformer (LVDT) or an optical encoder either of which use a measurement arm that contacts the regions, rely on using clumsy devices that would interfere with the workpieces. Acoustic measurements, specifically using ultrasonics, do not suffer from these drawbacks. Hence, in the preferred embodiment disclosed herein, a signal representing this curve is generated acoustically and specifically through ultrasonic measurements of delta x. Now regardless of the measurement technique chosen, measurements of delta x can occur in either one of two ways: either delta x can be measured directly, or alternatively two measurements can be made of distance x and then subtracted, using a processor or hardwired circuit, to form a corresponding value of delta x. To simplify the hardware, the value of delta x is directly measured in the preferred embodiment as is described in detail below.

In a preferred embodiment depicted on FIG. 1, block 100 shown in broken lines represents a resistance welding machine; block 200 shown in broken lines represents a system for measuring the distance between upper workpiece surface 113 and transducers 118; block 300 shown in broken lines represents a system for measuring the distance between the upper and lower electrodes 103 and 104, respectively; and block 400 shown in broken lines represents a system for measuring a distance between lower workpiece surface 114 and transducers 121. Block 500 is a device such as a computer or microprocessor with associated memory, which calculates the measurements, and operates the inventive welding apparatus.

The elements included within block 100 will now be discussed in detail. Upper electrode holder 101 and lower electrode holder 102 are part of a much larger welding apparatus which is not shown. Electrodes 103 and 104 are mounted in and electrically connected to electrode holders 101 and 102, respectively, and as noted hereinabove, form part of electrode assemblies 141 and 142, respectively. When electrode holders 101 and 102 are brought together under force, electrodes 103 and 104 are also brought together, thereby squeezing workpieces 105 and 106 together. Electrode holders 101 and 102 and electrodes 103 and 104 are made of electrically conducting material. Welding transformer 107 has a high current, low voltage secondary which is electrically connected between electrode holders 101 and 102. Switch 108, typically a pair of high current silicon controlled rectifiers (SCRs), is used to turn the primary of transformer 107 on and off, thereby controlling the flow of welding current to electrodes 103 and 104. SCR driver 109 is controlled by computer 500, through line 110, and is used to operate switch 108. Primary power for the welding machine is supplied by lines 111 and 112. Power for the computer 500 is supplied by lines 501 and 502.

Indicator light 503 on computer 500 may be used to indicate when welds have reached the desired amount of indentation. Alternatively, indicator light 504 may be used to indicate when welds have not reached the desired amount of indentation. Other outputs (not shown) from the computer may also be used to provide weld acceptance data for use in the control of weld quality and welded workpiece acceptance.

As shown in FIG. 1, transducers 118 and 121 are illustratively fixed to electrodes 103 and 104, respectively. As discussed in detail below, transducers 118 and 121 generate signals 119 and 122 which travel through air toward workpieces 105 and 106, respectively. Transducers 118 and 121 then receives echoes 120 and 123 of these signals reflected by surfaces 113 and 114 of workpieces 105 and 106, respectively.

Transducers 124 and 125 are acoustically connected to electrode holders 101 and 102, respectively. As discussed in detail below, transducer 124 is used to send an acoustical or ultrasonic signal through electrode holder 101, electrode 103, workpieces 105 and 106, electrode 104 and electrode holder 102 which is, in turn, received by transducer 125.

As soon as sufficient welding power has been applied to workpieces 105 and 106, electrodes 103 and 104, which apply a squeezing force to workpieces 105 and 106 due to the force exerted by electrode holders 101 and 102, begin to indent surfaces 113 and 114 of workpieces 105 and 106, respectively. To reduce the amount of or alternatively even eliminate indentation that would otherwise occur at the surface of either of these workpieces, the tip of one of the electrodes that contacts the material, such as electrode tip 115 or electrode tip 116, may be entirely flat. Such an electrode is often used in making welds for aeronautical applications, such as welding a material to the skin of an aircraft. In this case, the flat electrode would be placed against the surface of the material that will be exposed to airflow, e.g. the external surface of an aircraft, in order to reduce or even eliminate the amount of weld induced dimpling (indentation) that would appear on this surface. To minimally disturb airflow, such welds generally possess less than 4% indentation on any such surface that would be exposed to any airflow. A conventional domed electrode would be placed against the other surface and indentation measurements would be made from this latter electrode. Alternatively, to reduce the area on the surface of a workpiece that will be indented, either electrode tip 115 or 116 may have a rounded conical shape.

Now, as weld pulse continues, the indentation at electrode tips 115 and 116 increases. To ensure that the finished weld will have sufficient strength, the indentation should be allowed to increase to typically between 5 to 10% of the thickness of the thinnest workpiece that is being indented. This is also the workpiece for which indentation should be measured. If indentation is allowed to increase too far, e.g. on the order of approximately 12% for some materials, then the heated workpieces become too thin to support and contain the liquefied weld material located in the weld area. Consequently, molten weld material is expelled from the weld area between the workpieces. Therefore, the maximum useable amount of indentation is governed by the onset of expulsion (commonly known as spitting). For materials having a relatively high hot strength, the maximum useable amount of indentation will likely be larger than that for materials having a relatively low hot strength. Nonetheless, by controlling indentation to reach a maximum value within a range extending between 5 to 10%, and typically approximately 7%, welds of sufficient strength can be produced in a wide variety of different weldable materials. Here, with maximum indentation being limited to a value within this range, a suitable nugget 117 containing material from both faying surfaces of the workpieces 105 and 106 will be formed upon cooling.

Figure 2:
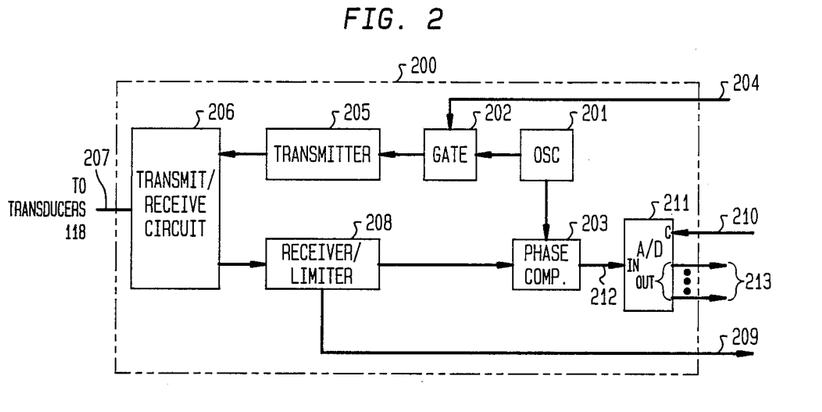
FIG. 2 is a schematic diagram of distance measuring system 200 shown in the embodiment of the present invention depicted in FIG. 1.

The elements included within block 200 shown in detail in FIG. 2 will not be discussed in detail. The distance measuring system of block 200 comprises oscillator 201, which generates a continuous signal to gate 202 and phase comparator 203. Oscillator 201 may be crystal controlled, so its output will not shift with time and otherwise cause errors. Through line 204, computer 500 periodically causes gate 202 to route the output of oscillator 201 to transmitter 205 for suitable amplification. The amplified output pulses produced by the transmitter appear as signal a in FIG. 5 and specifically are marked as the "A" pulses. Now, as shown in FIG. 2, the pulsed output of transmitter 205 passes through transmit-receive circuit 206 by line 207 to transducers 118 mounted on welder electrode 103. As shown in FIG. 1, the pulsed signal generated by each one of transducers 118 is transmitted downward through air toward surface 113 of workpiece 105 as shown by solid arrow 119. The signal is reflected back upward by surface 113 through the air to the corresponding one of transducers 118 as shown by dashed arrow 120. Substantial spreading of the signal occurs both at transducers 118 during transmission and at surface 113 during reflection. Reflected signal 120 is usually known as the echo. Transducers 118 may be of the capacitance type or the piezoceramic type suitably constructed to work at the desired frequency. The transmission of the signal through air follows the basic formula $v = f \times LAMBDA$, where v is the velocity of the signal in air, f is the frequency of the signal, and LAMBDA is the wavelength of the signal. If an ultrasonic signal is used, its velocity is about 13.5 inches/millisecond in dry air at room temperature. Since the electrode indentation is typically small, the measured time change in detection of the echo due to indentation between the transducer and the surface of the workpiece is also small. Either pulse detection or phase detection may be used to measure the change in distance due to the indentation of electrodes 103 and 104 into surfaces 113 and 114, respectively. Pulse detection, however, requires precise detection of the time relation between the transmitted and received pulse edges. Since, in practice, pulses are typically distorted, phase detection is often a more practical and accurate method for the measurement of small distances. Phase detection is the measurement of the phase shift that occurs between the transmitted and received signals. The distance, through which the signal travels, changes as the indentation occurs thereby causing the received signal to return sooner due to the shortening distance between transducers 118 and 121 and respective surfaces 113 and 114.

Received echo signal 120 is sent to transmit-receive circuit 206 by line 207, as shown in FIG. 2 and, from there, to receiver/limiter 208. The receiver pulses are shown in signal a in FIG. 5 as the "B" pulses. Now, as shown in FIG. 2, the limiting action of receiver/limiter 208 clips both the positive and negative portion of the signal thereby providing a nearly square wave. The resulting signal is sent to computer 500 by line 209 for subsequent use as an interrupt signal and to phase comparator 203. Phase comparators may compare signals over 90 degrees or 180 degrees of a signal's cycle. Comparator 203 preferably compares signals over 180 degrees thereby reducing the required transmitter frequency.

As noted, the signal on line 209, which is routed to computer 500, provides an interrupt to the computer. Whenever such an interrupt occurs, computer 500 generates a properly times pulse on line 210 which is connected to the control (C) input of analog-to-digital (A/D) converter 211. This, in turn, causes the converter to read and convert the signal applied to its input via line 212 from phase comparator 203. The binary coded value of the phase comparator output signal is routed from the output of A/D converter 211, via leads 213, to computer 500.

The time between the transmission of pulse 119 and reception of echo pulse 120 (signal transit time) must be long enough to allow transducers 118 to stop vibrating so that erroneous signals are not measured. This signal transit time is typically fixed for each installation; therefore, computer 500 can be programmed to ignore signals received at the moment pulse 119 is transmitted and during the majority of the transit time of pulse 119 and echo 120.

Figure 4:
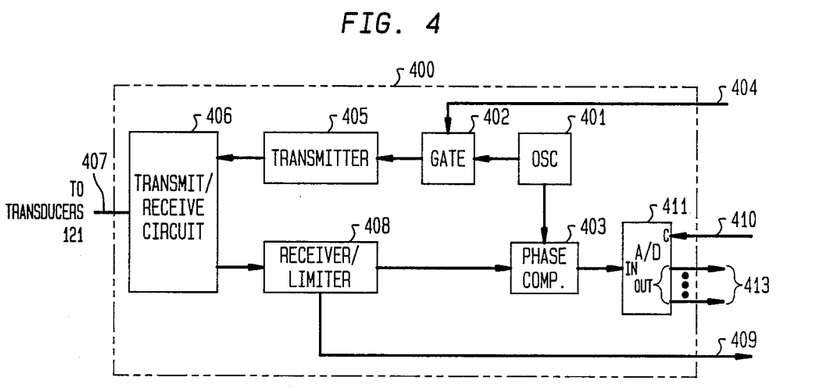
FIG. 4 is a schematic diagram of distance measuring system 400 also shown in the embodiment of the present invention depicted in FIG. 1.

The elements included within block 400 are shown in detail in FIG. 4 and comprise a distance measuring system similar to that of distance measuring system 200 and will therefore not be discussed in detail.

As previously discussed, transducers 121 mounted on electrode 104 are used to transmit signals 122 and receive echo signals 123 in measuring the indentation of electrode 104 into lower surface 114 of workiece 106. The two distance measuring systems 200 and 400 may be used simultaneously or staggered in time. The indentation measured by systems 200 and 400 may be used independently, such as if workpieces 105 and 106 ar of different thickness. Additionally, either system 200 or system 400 may be used alone to provide signals suitable for the control of the welder. Alternatively, the values measured by systems 200 and 400 may be averaged and then used by computer 500 to control welder 100 via line 110. If either one of electrodes 103 or 104 is shaped so that it has a large flat tip in order to minimize indentation on that side of the workpiece, then the measuring system for the opposite electrode is preferably used to measure indentation and to control welder 100 by the measured indentation.

Figure 3:
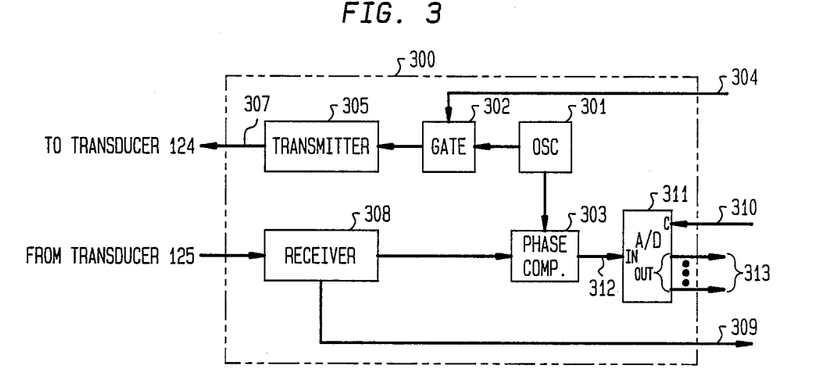
FIG. 3 is a schematic diagram of distance measuring system 300 also shown in the embodiment of the present invention depicted in FIG. 1.

The elements within block 300 are shown in detail in FIG. 3 and will now be discussed in detail. Distance measuring system 300 is used to measure the total thickness of workpieces 105 and 106 before the weld pulse commences. Since the indentation control process is based both on the initial thickness of the thinnest one of the workpieces and the total thickness of all the workieces, then, if, before each weld, the initial thickness of the thinnest workpiece is provided (either manually or through a measurement) to computer 500 and also the total thickness of all the workpieces being welded is measured, the computer can determine the amount of indentation to be generated and the accompanying power needed in the weld pulse to produce this indentation and thereby provide the correct indentation and weld power level control information during the welding operation to control it. In response to an appropriate signal generated by computer 500 and appearing on lead 304, an output pulse generated by oscillator 301 is routed through gate 302 to transmitter 305 for suitable amplification. From there, the amplified pulse is routed by line 307 to transducer 124 which is mounted on upper electrode holder 101. As shown in FIG. 1, transducer 124 sends the pulse down through electrode holder 101, electrode 103, the workpieces then situated between both electrodes, electrode 104 and electrode holder 102 to be received by receiver transducer 125. The pulse signal received by transducer 125 is then sent, as shown in FIG. 3, to receiver 308. The received signal is processed by distance measuring system 300 in a fashion similar to that in which signals are processed by the distance measuring systems 200 and 400, as discussed above. The frequency of oscillator 301 is adjusted to cover the range of material thicknesses of the workpieces to be welded. For a phase detector using 180 degrees of measurement, the frequency of oscillator 301 is preferably adjusted to yield a wavelength slightly longer than twice the thickness of the thickest stack of workpieces to be welded by the inventive apparatus.

The operation of the welding apparatus of the present invention will now be discussed with reference to FIG. 5 in which a simple weld sequence is shown. In the illustrated weld sequence, electrodes 103 and 104 are first brought together during the "squeeze" operation, then followed by 6 cycles at power line frequency of welding current (the weld pulse) to provide welding heat (signal b), and finally followed by a short "hold" period during which workpieces 105 and 106 are allowed to cool prior to being released. The timed relationship between the sequence of ultrasonic pulses (signal a) used to measure initial thickness (hereinafter referred to as thickness pulses), welding current half cycles 606 (signal b), and ultrasonic pulses (signal c) used to measure indentation (hereinafter referred to as indentation pulses) is shown. In this example, the indentation is sensed every half cycle of the welding current and during the hold period, although indentation measurements can be taken more or less frequently. The indentation into workpieces 103 and 104 shown by scale 601 is depicted in curve d of FIG. 5, as a percentage of the initial thickness of the workpiece being measured. The total initial thickness of all the workpieces would be determined by distance measuring system 300 after electrodes 103 and 104 are brought together to squeeze workpieces 105 and 106 together and before the welding pulse begins. Signal a shows such measuring pulses, where the "A" pulses are transmitted by transducer 124 of block 100 and the "B" pulses are received by transducer 125 of block 100. When the welding current is first applied, the measure indentation frequently has a negative value (corresponding to an expansion) as shown by the rise in curve d occurring at region 603. This is due to the non-uniform heating of workpieces 103 and 104 between the electrodes. The material in contact with each electrode is heated rapidly, while the material in the vicinity of, though not in contact with, each electrode is heated at a slower rate. This non-uniform heating causes illustratively upper electrode 103 to be pushed up by expansion of the material situated immediately under it thereby causing the distance between the transducer on electrode holder 101 and workpiece 105 to increase. Subsequently during the welding sequence, when the material situated directly under electrode 103 loses strength due to the elevated temperature and the onset of plasticity and melting, electrode 103 begins to indent into the surface as shown by the change in direction of the measured indentation occurring at region 604 shown in curve d. As additional heat is applied, the indentation progresses rapidly until the last half cycle of welding current occurs. Then, as workpieces 105 and 106 cool, some further indentation occurs in region 605 shown in curve d. This latter indentation results from shrinkage of material in the vicinity of nugget 117 (as shown in FIG>1) as the nugget solidifies and shrinks during cooling. As can be seen from curve d in FIG. 5, typically for many materials, two thirds of the indentation is measured during the time welding current half cycles are applied, while one third of the total indentation occurs after the last such half cycle is applied. This indentation behavior provides a very good measure for use in indentation control. The indentation that occurs after the last half cycle of welding current (i.e. after the weld pulse terminates) can then be subtracted by computer 500 to determine the amount of indentation that has occurred during the application of the weld pulse.

During operation, the electrodes are first brought together. In resistance spot welders, this may be done by initiation of a foot or hand switch, or a command from a control, as is done in automatic welding controls. In setting up the workpiece thickness measuring system to measure the thickness of a particular workpiece specifically the thinnest workpiece being indented, the electrodes are first squeezed together without placing any workpieces between the electrodes. A pulse from transmitter 305 (see FIG. 3) is sent, as shown in FIG. 1, via transducer 124, through electrode holder 101, electrodes 103 and 104 and into electrode holder 102. This pulse is then routed, via transducer 125 and line 317, to receiver 308. The phase relation between the outputof oscillator 301 and the output of receiver 308, shown in FIG. 3, is then measured and used as a workpiece zero thickness reference. Thereafter, the thinnest workpiece is placed between the electrodes. The electrodes then squeeze this workpiece. Next, a pulse from transmitter 305 is sent, via transducer 124, through electrode holder 101, electrode 103, the thinnest workpiece situated therebetween, electrode 104 adn electrode holder 102. This pulse is then routed, via transducer 125 and line 317, to receiver 308. To simplify the drawing, only those ultrasonic pulses for measuring the thickness of the thinnest workpiece are shown in signal a in FIG. 5. The "A" pulses correspond to pulses from transmitter 305 and the "B" pulses correspond to echo pulses appearing at the input of receiver 308 (see FIG. 3). Clearly, the pulses of measuring the workpiece zero thickness reference would also form part of this signal and would precede and resemble the pulses shown. The value of the resulting phase difference for the thinnest workpiece less the value of the phase difference obtained as the workpiece zero thickness reference provides a measure of the thickness of the thinnest workpiece. In this manner, the system can be calibrated for thickness measurements by sequentially inserting workpieces of several different thicknesses and measuring the phase shift for each workpiece thickness. This procedure provides adequate information for computer 500 to use in the control of the desired percentage of indentation for subsequent measurements. Alternatively, the thickness value for the thinnest workpiece can be manually entered into computer 500 (see FIG. 1).

In the next operational step, all the workpieces to be welded are placed between the electrodes and the electrodes are brought together to squeeze all these workpieces together. A few ultrasonic pulses, resembling that in signal a in FIG. 5, may also need to be transmitted before any welding current begins to flow in order to measure the total thickness of the workpieces in order to set the weld power to an appropriate level so as to generate the proper amount of indentation. Otherwise, the rate at which indentation occurs may be too slow or indentation may not occur at all. In any event, the computer then proceeds to control indentation by either one of two methods: regulating the rate of which indentation occurs, thereby forcing the indentation to follow a pre-defined (programmed) indentation curve, or merely allowing the indentation to reach a pre-defined maximum amount. In the former method, the magnitude of each half cycle of weldingc current, which is to be applied to the workpieces, is appropriately varied, based upon the then existing difference between the measured amount of indentation and a corresponding value specified by the indentation curve, so as to drive the difference to zero. For the latter method, all the half cycles of welding current are maintained at a constant duration. These half cycles are successively applied to the workpieces until a pre-defined maximum amount of indentation is achieved regardless of the amount of time required for this indentation to occur.

Specifically, after the squeeze operation has been completed and all the initial thickness measurements have been obtained, computer 500 (see FIG. 1) starts the flow of welding current through the electrodes as shown in signal b depicted in FIG. 5. During the first half cycle of welding current, the indentation pulses are started so that the indentation can be monitored. These pulses are shown in signal c. Each ultrasonic pulse shown on line 602 of signal a and on line 607 of signal c may actually comprise 10 cycles of the chosen ultrasonic frequency. For example, if transducers 118 and 121 generate a signal with a frequency of about 100 kHz, then the duration of the ultrasonic pulse, having ten cycles, would then be about 0.1 milliseconds. Since the distance between transducers 118 and 121 is typically about 3 inches, then the total travel time for the ultrasonic pulse in air would be typically about 0.5 millisecond. For clarity in illustration, the pulses in signal a and c are shown somewhat longer in time than their actual typical values specified above.

In typical applications where fully automatic operation of the welder is desired, measuring system 300 (see FIGS. 1 and 3) may be used to start the welding current. The "B" pulses in signal a shown in FIG. 5, however, cannot be received until electrodes have contacted and squeezed the workpiece(s) being measured. Since the workpieces frequently do not fit together tightly upon initial contact, a force must first be applied by the electrodes to the workpieces to squeeze the workpieces together until they are in intimate electrical contact. Moreover, by sending a series of pulses from distance measuring system 300 as all the workpieces are initially being squeezed together, this distance measuring system can determine when all the workpieces are firmly brought together so that the heating part of the welding process can begin. Similarly, distance measuring system 200 or 300 (see FIG. 1) can be used to measure when electrode 103 or 104 contacts workpiece 105 or 106, respectively.

Now, after the thickness of the workpieces has been measured, heat is applied to the workpieces by starting the current flow as shown in signal b in FIG. 5. The indentation pulses generated by distance measurement systems 200 and 400 may be synchronized to the welding current signal so that an indentation measurement is made once every half cycle of welding current as shown in signal c.

Since it may be desirable to control the rate at which the indentation occurs, the measured indentation can be made to follow a desired indentation curve, as shown by curve 608 (curve d) in FIG. 5, by appropriately programming of computer 500. In this case, the computer may measure the indentation at every welding current half cycle and compare the measured value with the desired indentation for each half cycle. Curve 608 represents a typical desired pre-defined indentation curve. If the indentation actually measured occurs too slowly compared to the desired rate of indentation, the rate of heating may be increased by computer 500 (see FIG. 1) by advancing the firing angle of SCR switch 108 through control line 110 and SCR driver 109. Stepped signal 611 shown in curve d of FIG. 5 shows measured values of indentaiton at points 609 and 610 which are less than the desired indentation shown by curve 608. The current correction for the low indentation is shown by enlarged half cycles 612 and 613 of signal b. These enlarged welding current half cycles cause the next actual measured value of indentation 614 to correspond to the desired value on curve 608. If the indentation is occurring too rapidly, the firing angle may be appropriately adjusted to apply less welding current to the workpieces. In particular, when the indentation is too fast as a result of too much heat being applied to the workpieces, the firing angle of SCR switch 108 (see FIG. 1) is retarded, by computer 500 and via lead 110, tehreby reducing the rate at which the indentation occurs. When computer 500 determines that the desired indentation has been reached (less the indentation which occurs by shrinkage during cooling) as shown at 615 of curve 608, the welding current is stopped (i.e. the wel pulse is terminated) and the weld is allowed to cool during a subsequent pre-defined "hold" period. After the "hold" period has elapsed, the electrodes are separated and the welded workpieces are removed.

In some welding work, only the amount of indentation may be controlled. In this case, the duration of all the welding current half cycles remain constant. Here, the computer measures the indentation during each half cycle of welding current. Successive half cycles are applied to the workpieces until the desired indentation is reached. When this occurs, the weld pulse is terminated. As such, the indentation rate and termination time at the desired amount of indentation can be controlled or, alternatively, the amount of indentation by itself can be controlled.

While the invention has been described in conjunction with specific embodiments, it is evident that numerous alternatives, modifications, and variations will be apparent to those skilled in the art in light of the foregoing description.

For example, variations in the particular distance measuring systems disclosed herein and other suitable measuring techniques may be used within the scope of the invention. Moreover, indentation may be measured with only one distance measuring system, such as distance measuring system 200 or 400, to obtain satisfactory indentation control.

Also, although the invention has been shown and described in the context of a resistance spot welder having two opposing electrodes, which is used in the vast majority of spot welding applications, these electrodes can be mounted in other configurations with indentation being measured accordingly to control the welding operation. For example, in series welding, both electrodes may abut against the same surface of one of two workpieces with a suitable conductive backup plate (or material) abutting against the other workpiece. In this case, welding current flows through one electrode, through both workpieces and/or the backup plate and, from there, finally into the other welding electrode. This configuration finds use in welding coated materials, such as illustratively welding tabs to coated sheet in which the sheet functions as the backup plate. With series welding, indentation can be measured as set forth above, for either electrode—assuming that substantially similar welding conditions prevail at both electrodes, or for both electrodes with the results being averaged together.

Lastly, the weld pulse need not be limited to contain approximately sinusoidal half cycles of welding current. Instead, the pulse can contain any one of many different repetitive waveforms, such as illustratively square waves (pulsating DC). Furthermore, the frequency of these repetitive waveforms nee dnot be that of the AC power (line frequency) but instead can be a value that lies within a wide range of frequencies.

I claim:

1. In a resistance welding system for welding at least two workpieces together, apparatus for measuring indentation occurring in at least one of said workpieces during a welding operation, said apparatus comprising:

at least one electrode assembly, comprising an electrode secured to an electrode holder, for holding at least two workpieces together and for applying a weld pulse to said workpieces, wherein the electrode situated in said one electrode assembly will abut against a surface of one of said workpieces over a contact area located on said surface during a welding operation;

means, having at least one sensing device wherein said one sensing device is secured to said one electrode assembly at a pre-defined location theroen, for determining, at least while said weld pulse is applied to said workpieces, a change in a distance separating said sensing device and a region situated on said surface, wherein said region is not substantially indented by the electrode during said welding operation; and means, responsive to said change, for producing at least one corresponding measured value of indentation.

2. The apparatus in claim 1 wherein said region is located on said surface and is situated adjacent to said contact area.

3. The apparatus in claim 2 wherein said change determining means comprises means for directly measuring said change in said distance, or means for measuring said distance and comparing two resulting distance measurements to determine a corresponding value of said change in said distance.

4. The apparatus in claim 3 wherein said sensor is an acoustical, optical, mechanical or magnetic device.

5. The apparatus in claim 4 wherien the producing means comprises means for ascertaining successive measured values of indentation in response to successive changes in said distance.

6. The apparatus in claim 5 wherien said change determining means comprises:

means for generating a first electrical pulse having a pre-defined ultrasonic frequency;

at least on ultrasonic transducer, serving as said sensing device and secured to said one electrode assembly at said pre-defined location thereon and responsive to said first electrical pulse, for generating a corresponding ultrasonic acoustical pulse, wherein acoustical energy provided by said one transducer irradiates said region, and for receiving an echo pulse generated by reflections of a portion of said acoustical energy from said region back to said one transducer;

means, responsive to said received echo pulse, for converting said received echo pulse into a second electrical pulse; and means, responsive to said first and second electrical pulses, for measuring a phase shift that occurs therebetween.

7. The apparatus in claim 6 wherein said change determining means further comprises:

an oscillator for generating said first electrical pulse;
a gate, responsive to a first control signal, for gating said first electrical pulse to a transmitting circuit;
said transmitting circuit for generating an appropriately amplified first electrical pulse;
means, connected to said transmitting circuit, to a receiving circuit and to said one transducer, for routing said amplified first electrical pulse to said one transducer and for routing said ehco pulse form said one transducer to sadi receiving circuit;
said receiving circuit for converting said echo pulse into said second electrical pulse;
a phase comparator for ascertaining a phase difference occurring between said first and second electrical pulses and providing an analog signal proportional to said phase difference;
an analog-to-digital converter for converting said analog signal at least one digital value; and
circuit means for generating said first control signal at pre-defined times and for determining, in response to said digital value, an associated numerical value of indentation.

8. The apparatus in claim 7 wherein the change determining means further comprises:
means for measuring combined thickness of said workpieces prior to applying the weld pulse to said workpieces, and
means, responsive to said ascertaining means, for providing a suitable indication when the indentation has reached a desired value.

9. The apparatus in claim 8 wherein the combined thickness measuring means comprises:
means for generating a third electrical pulse having a pre-defined ultrasonic frequency;
a second ultrasonic transducer, secured to said one electrode assembly and responsive to said third electrical pulse, for generating a corresponding pulse of acoustical energy that propagates through said one electrode assembly, through said workpieces, and through another electrode assembly which abuts against another one of said workpieces;
a third ultrasonic transducer, secured to said other electrode assembly, for receiving a portion of said pulsatile acoustical energy originating from said second transducer;
means for converting said received pulsatile acoustical energy into a fourth electrical pulse;
means, responsive to said third and foruth electrical pulses, for measuring a value of phase shift that occurs therebetween; and
means for producing a value representative of said combined thickness of said workpieces in response to a difference between two measured values of said phase shift, wherein one of said two measure dphase shift values is generated when both of said electrodes contact each other and the other one of said two measured phase shift values is generated when said workpieces are being squeezed by said one electrode assembly.

10. In a resistance welding system in which at least one electrode assembly, comprising an electrode secured to an electrode holder, is used to hold at least two workpieces together and to apply a weld pulse to said workpieces, wherein the electrode situated in said one electrode assembly will abut against a surface of one of said workpieces over a contact area located on said surface during a welding operation; a method for measuring indentation occurring in said surface during said welding operation comprising the steps of:
applying an appropriate force to said electrode assembly to squeeze said workpieces together;
applying a weld pulse to said workpieces;
determining, at least while said weld pulse is applied to said workpieces, a change in a distance separating a pre-defined location on said electrode assembly and a region situated on said surface, wherein said region is adjacent to said contact area but is not substantially indented by the electrode during said welding operation; and
producing, in response to said change, at least one corresponding measured value of indentation.

11. The method in claim 10 wherein said region is located on said surface and is situated adjacent to said contact area.

12. The method in claim 11 wherein said change determining step includes the step of: directly measuring said change in said distance, or the steps of: measuring said distance and comparing two resulting distance measurements to determine a corresponding value of said change in said distance.

13. The method in claim 12 wherein the producing step comprises the step of ascertaining successive measured values of indentation in response to successive changes in said distance.

14. The method in claim 13 wherein said change determining step further comprises the steps of:
generating a first electrical pulse having a pre-defined ultrasonic frequency;
generating, in response to said first electrical pulse, a corresponding ultrasonic acoustical pulse using at least one ultrasonic transducer that is secured to said one electrode assembly at said pre-defined location, wherein acoustical energy provided by said one transducer irradiates said region;
detecting an echo pulse generated by reflections of a portion of said acoustical energy from said region back to said one transducer;
converting said received echo pulse into a second electrical pulse; and
measuring, in response to said first and second electrical pulses, a phase shift that occurs therebetween.

15. The method in claim 14 wherein the change determining step further comprises the steps of:
measuring combined thickness of said workpieces prior to applying the weld pulse to said workpieces, and
providing, in response to said ascertaining step, a suitable indication when the indentation has reached a desired value.

16. The method in claim 15 wherein the combined thickness measuring step comprises the steps of:
generating a third electrical pulse having a pre-defined ultrasonic frequency;
generating, from a second ultrasonic transducer, secured to one of said electrode assemblies and responsive to said third electrical pusle, a corresponding pulse of acoustical energy that propagates through one of said electrode assemblies, through said workpieces, and through another electrode assembly that abuts against another one of said workpieces;
receiving, from a third ultrasonic transducer secured to said other electrode assembly, a portion of said pulsatile acoustical energy originating from said second transducer;

converting said received pulsatile acoustical energy into a fourth electrical pulse;

measuring, in response to said third and fourth electrical pulses, a value of phase shift that occurs therebetween; and producing a vlue representative of said combined thickness of said workpieces in response to a difference between two measured values of said phase shift, wherein one of said two measured phase shift values is generated when both of said electrodes contact each other and the other one of said two measured phase shift values is generated when said workpieces are being squeezed by said one electrode assembly.

17. In a resistance welding system for welding at least two workpieces together, apparatus for measuring indentation occurring in at least one of said workpieces during a welding operation and for controlling a weld pulse used therein, said apparatus comprising:

at least one electrode assembly, comprising an electrode secured to an electrode holder, for holding at least two workpieces together and for applying a weld pulse to said workpieces, wherein the electrode situated in said one electrode assembly will abut against a surface of one of said workpieces over a contact area located on said surface during said welding operation;

means for applying said weld pulse to said one electrode assembly;

means, having at least one sensing device wherein said one sensing device is secured to said one electrode assembly at a pre-defined location thereon, for determining, at least while said weld pulse is applied to said workpieces, a change in a distance separating said sensing device and a region situated on said surface, wherein said region is not substantially indented by the electrode during said welding operation;

means, responsive to said change, for producing a corresponding measured value of indentation; and means, connected to said applying means, for controlling said weld pulse in response to said measured value of indentation.

18. The apparatus in claim 17 wherein said region is located on said surface and is situated adjacent to said contact area.

19. The apparatus in claim 18 wherein said change determining means comprises means for directly measuring said change in said distance, or means for measuring said distance and comparing two resulting distance measurements to determine a corresponding value of said change in said distance.

20. The apparatus in claim 19 wherein said sensor is an acoustical, optical, mechanical or magnetic device.

21. The apparatus in claim 20 wherein the producing means comprises means for ascertaining successive measured values of indentation in response to successive changes in said distance.

22. The apparatus in claim 21 wherein the applying means further comprises:

means for applying a weld pulse, having a series of welding current half cycles, to said one electrode assembly; and means, responsive to a current control signal, for establishing a duration of each of said half cycles; and wherein said wel pulse controlling means comprises:

means for comparing at least one of said measured indentation values against a corresponding one of a plurality of pre-defined indentation values and for forming ad ifference value indicative of the difference therebetween, wherein said plurality of pre-defined indentation values forms a pre-defined indentation curve;

means, responsive to said changes, for generating said current control signal such that the current control signal suitably adjusts duration of at least one of said half cycles in order to cause the measured indentation to tend to follow the indentation curve; and means for terminating the weld pulse whenever the measured indentation reaches a pre-defined value.

23. The apparatus in claim 22 wherein said comparing means comprises means for performing said comparison at least once during each one of said half cycles; and said current control signal generating means comprises means, operative in response to said difference value obtained during any one of said half cycles, for changing said current control signal in order to suitably adjust the duration of a next successive one of said half cycles.

24. The apparatus in claim 21 whereinthe applying means further comprises means for applying a weld pulse, having a series of said welding current half cycles wherein all the half cycles in said series have a substantially equivalent duration, to said electrode assemblies; and wherein said weld pulse controlling means comprises means for terminating the weld pulse whenever the measured indentation reaches a pre-defined value.

25. The apparatus in claim 23 or 24 further comprising means for moving said one electrode assembly away from the workpieces and releasing the workpieces once a pre-defined interval of time has elapsed after the weld pulse has been terminated in order to allow a weld nugget formed between the workpieces to sufficiently solidify.

26. The apparatus in claim 25 wherein said change determining means comprises:

means for generating a first electrical pulse having a pre-defined ultrasonic frequency;

at least one ultrasonic transducer, secured to said one electrode assembly at said pre-defined location thereon and responsive to said first electrical pulse, for generating a corresponding ultrasonic acoustical pulse, wherein acoustical energy provided by said one transducer irradiates said region, and for reeiving an echo pulse generated by reflections of a portion of said acoustical energy from said region back to said one transducer;

means for converting said received echo pulse into a second electrical pulse; and means, responsive to said first and second electrical pulses, for measuring a phase shift that occurs therebetween.

27. The apparatus in claim 26 wherein said change determining means further comprises:

an oscillator for generating said first electrical pulse;

a gate, responsive to a first control signal, for gating said first electrical pulse to a transmitting circuit;

said transmitting circuit for generating an appropriately amplified first electrical pulse;

means, connected to said transmitting circuit, to a receiving circuit and to said one transducer, for routing said amplified first electrical pulse to said one transducer and for routing said echo pulse from said one transducer to said receiving circuit;

said receiving circuit for converting said echo pulse into said second electrical pulse;

a phase comparator for ascertaining a phase difference occurring between said first and second electrical pulses and providing an analog signal proportional to said phase difference;

an analog-to-digital converter for converting said analog signal into at least one digital value; and circuit means for generating said first control signal at pre-defined times and for determining, in response to said one digital value, an associated numerical value of indentation.

28. The apparatus in claim 27 wherein the change determining means further comprises:

means for measuring combined thickness of said workpieces prior to applying the weld pulse to said workpieces, and means, responsive to said ascertaining means, for providing a suitable indication when the indentation has reached a desired value.

29. The apparatus in claim 28 wherein the combined thickness measuring means comprises:

means for generating a third electrical pulse having a pre-defined ultrasonic frequency;

a second ultrasonic transducer, secured to said one electrode assembly and responsive to said third electrical pulse, for generating a corresponding pulse of acoustical energy that propagates through said one electrode assembly, through said workpieces, and through another electrode assembly which abuts against another one of said workpieces;

a third ultrasonic transducer, secured to said other electrode assembly, for receiving a portion of said pulsatile acoustical energy originating from said second transducer;

means for converting said received pulsatile acoustical energy into a fourth electrical pulse;

means, responsive to said third and fourth electrical pulses, for measuring a value of phase shift that occurs therebetween; and means for producing a value representative of said combined thickness of said workpieces in response to a difference between two measured values of said phase shift, wherein one of said two measured phase shift values is generated when both of said electrodes contact each other and the other one of said two measured phase shift values is generated when said workpieces are being squeezed by said one electrode assembly.

30. In a resistance welding system in which at least one electrode assembly, comprising an electrode secured to an electrode holder, is used to hold at least two workpieces together and apply a weld pulse to said workpieces, wherein the electrode situated in said one electrode assembly will abut against a surface of one of said workpieces over a contact area located on said surface during a welding operation; a method for measuring indentation occurring in said surface during said welding operation and for controlling the weld pulse, said method comprising the steps of:

applying an appropriate force to said electrode assembly to squeeze said workpieces together;

applying a weld pulse to said electrode assemblies;

determining, at least while said weld pulse is applied to said workpieces, a change in a distance separating a pre-defined location on said one electrode assembly and a region situated on said surface, wherein said region is adjacent to said contact area but is not substantially indented by the electrode during said welding operation;

producing, in response to said change a corresponding measured value of indentation; and controlling said weld pulse in response to said measured value of indentation.

31. The method of claim 30 wherein said region is located on said surface and is situated adjacent to said contact area.

32. The method in claim 31 wherein said change determining step includes the step of: directly measuring said change in said distance, or the steps of: measuring said distance and comparing two resulting distance measurements to determine a corresponding value of said change in said distance.

33. The method in claim 32 wherein the producing step comprises the step of ascertaining successive measured values of indentation in response to successive changes in said distance.

34. The method in claim 33 wherein the applying step further comprises the steps of:

applying said weld pulse, having a series of welding current half cycles, to said electrode assemblies; and establishing, in response to a current control signal, a duration of each of said half cycles; and wherein said weld pulse controlling step comprises the steps of:

comparing at least one of said measured indentation values against a corresponding one of a plurality of pre-defined indentation values and forming a difference value indicative of the difference therebetween, wherein said plurality of pre-defined indentation values forms a pre-defined indentation curve;

generating, in response to said difference value, said current control signal such that the current control signal suitably adjusts the duration of at least one of said half cycles in order to cause the measured indentation to tend to follow the indentation curve; and terminating the weld pulse whenever the measured indentation reaches a pre-defined value.

35. The method in claim 34 wherein said comparing step comprises the step of performing said comparison at least once during each one of said half cycles; and said current control signal generating step comprises the step of changing said current control signal, in response to said difference value obtained during any one of said half cycles, in order to suitably adjust the duration of a next successive one of said half cycles.

36. The method in claim 33 wherein the applying step further comprises the step of applying a weld pulse having a series of welding current half cycles wherein all the half cycles in said series have a substantially equivalent duration, to said electrode assemblies; and wherein said weld pulse controlling step comprises the step of terminating the weld pulse whenever the measured indentation reaches a pre-defined value.

37. The method in claim 35 or 36 further comprising the step of moving said one electrode assembly away from said workpieces to release the workpieces once a pre-defined interval of time has elapsed after the welding current has been terminated in order to allow a weld nugget formed between the workpieces to sufficiently solidify.

38. The method in claim 37 wherein said change determining step further comprises the steps of:

generating a first electrical pulse having a pre-defined ultrasonic frequency;

generating, in response to said first electrical pulse, a corresponding ultrasonic acoustical pulse using at least one ultrasonic transducer which is secured to said one electrode assembly at said pre-pre-defined location, wherein acoustical energy provided by said one transducer irradiates said region;

detecting an echo pulse generated by reflections of a portion of said acoustical energy from said region back to said one transducer;

converting said received echo pulse into a second electrical pulse; and measuring, in response to said first and second electrical pulses, a phase shift that occurs therebetween.

39. The method in claim 38 wherein the change determining step further comprises the steps of:

measuring combined thickness of said workpieces prior to applying the weld pulse to said workpieces, and providing, in response to said ascertaining step, a suitable indication when the indentation has reached a desired value.

40. The method in claim 39 wherein the combined thickness measuring step comprises the steps of:

generating a third electrical pulse having a pre-defined ultrasonic frequency;

generating, from a second ultrasonic transducer, secured to said one electrode assembly and responsive to said third electrical pulse, a corresponding pulse of acoustical energy that propagates through said one electrode assembly, through said workpieces, and through the another electrode assemblies that abuts against another one of said workpieces;

receiving, from a third ultrasonic transducer secured to said other electrode assembly, a portion of said pulsatile acoustical energy originating from said second transducer;

converting said received pulsatile acoustical energy into a fourth electrical pulse;

measuring, in response to said third and fourth electrical pulses, a value of phase shift that occurs therebetween; and producing a value representative of said combined thickness of said workpieces in response to a difference between two measured values of said phase shift, wherein one of said two measured phase shift values is generated when both of said electrodes contact each other and the other one of said two measured phase shift values is generated when said workpieces are being squeezed by said one electrode assembly.

* * * * *